Patented July 21, 1931

1,815,748

UNITED STATES PATENT OFFICE

HERMANN WAGNER, OF BAD-SODEN-AM-TAUNUS, ALBERT KISSLING, OF FRANKFORT-ON-THE-MAIN-HOCHST, ERNST HOTZ, OF HATTERSHEIM, NEAR FRANKFORT-ON-THE-MAIN, AND WILHELM FITZKY, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

2-HALOGEN-3-CHLORO-4-AMINO-1-METHYLBENZENE-6-SULPHONIC ACIDS AND PROCESS OF PREPARING THEM

No Drawing. Application filed August 8, 1929, Serial No. 384,493, and in Germany September 7, 1928.

The present invention relates to 2-halogen-3-chloro-4-amino-1-methylbenzene-6-sulphonic acids and a process of preparing them, more particularly it relates to compounds of the following general formula:

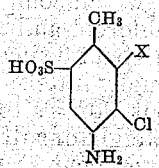

wherein X stands for a chlorine or a bromine atom.

We have found that the hitherto unknown sulphonic acids of the 2-halogen-3-chloro-4-amino-1-methylbenzenes are obtainable by treating these compounds with sulfonating agents, whereby according to the nature of the sulfonating agent used and according to the conditions observed during the sulfonation the sulfo group enters one of the positions 5 or 6 still free in the benzene nucleus.

Thus the 2-halogen-3-chloro-4-amino-1-methylbenzene-5-sulphonic acids are obtained by treating the 2-halogen-3-chloro-4-amino-1-methylbenzenes either with concentrated sulfuric acid alone at an elevated temperature, as, for instance, at about 170° C. to 200° C., or by causing one molecular proportion of such a compound dissolved in concentrated sulfuric acid to react with one molecular proportion of sulfuric anhydride dissolved in concentrated sulfuric acid. In this latter case the formation of the sulphonic acid sets in even at a considerably lower temperature, namely at about 100° C. to 130° C.

This process is subject matter of our co-pending U. S. patent application Serial No. 384,492, filed August 8, 1929.

The 2-halogen-3-chloro-4-amino-1-methylbenzene-6-sulphonic acids of the above stated general formula which are the subject matter of the present invention are, however, obtained besides a minute quantity of 5-sulphonic acid by treating the 2-halogen-3-chloro-4-amino-1-methylbenzenes with a large excess of strongly fuming sulfuric acid containing about 65 per cent of sulfuric anhydride at about 90° C. to 120° C.

The 6-sulphonic acid can be easily separated from the small quantity of 5-sulphonic acid since the sulfonates are of different solubility. Thus, for instance, the sodium salt of 2.3-dichloro-4-amino-1-methylbenzene-6-sulphonic acid is very readily soluble, unlike the sodium salt of the corresponding 5-sulphonic acid which is very sparingly soluble, especially in the presence of some sodium chloride.

The 2-halogen-3-chloro-4-amino-1-methylbenzene-6-sulphonic acids may also be obtained by sulfonating a technical mixture of 2-halogen-3-chloro- and 2.5-dihalogen-4-amino-1-methylbenzenes in the manner above described. The 2.5-dihalogen compounds are not changed by this operation and may easily be separated from the 2-halogen-3-chloro-4-amino-1-methylbenzene-6-sulphonic acids formed.

The following examples serve to illustrate our invention but they are not intended to limit it thereto, the parts being by weight:

(1) 176 parts of 2.3-dichloro-4-amino-1-methylbenzene, obtainable according to U. S. patent specification No. 1,712,173, are dissolved in 500 parts of sulfuric acid monohydrate, 500 parts of fuming sulfuric acid containing 65 per cent of sulfuric anhydride are then added, the mixture is rapidly heated up to 120° C. and immediately poured on ice. The separation of the sulphonic acid is completed by adding sodium chloride. The sulphonic acid is filtered by suction, the paste is stirred with 1 liter of water and rendered feebly alkaline by the addition of sodium hydroxide; thereupon the mass is filtered from the minute quantity of the sparingly soluble sodium salt of 2.3-dichloro-4-amino-1-methylbenzene-5-sulphonic acid; the 2.3-dichloro-4-amino-1-methylbenzene-6-sulphonic acid is precipitated in the filtrate by means of hydrochloric acid. The sulphonic acid thus obtained is a white powder, yields a very readily soluble sodium salt and can be very easily diazotized.

(2) 176 parts of a mixture consisting of 2.3-dichloro- and 2.5-dichloro-4-amino-1-methylbenzene, obtainable by the action of chlorine on 2-chloro-4-aceto-amino-1-methylbenzene in acetic acid and subsequently saponifying the two isomeric dichloro-4-acetamino-1-methylbenzenes, are dissolved in 500 parts of sulfuric acid monohydrate, 400 parts of fuming sulfuric acid containing 65 per cent of sulfuric anhydride are added, the whole is heated for 10 minutes to 90° C. and poured upon ice. The precipitation of the mixture of the products thus formed is completed by the addition of sodium chloride. The mixture of the products is filtered by suction, the paste is mixed while stirring with 5000 parts of water, rendered alkaline and filtered at 60° C. The unchanged 2.5-dichloro-4-amino-1-methylbenzene of the melting point 89° C. to 91° C. remains on the filter. The filtrate is stirred while cold whereby the small quantity of the more sparingly soluble sodium salt of 2.3-dichloro-4-amino-1-methyl-benzene-5-sulphonic acid is precipitated. Thereupon this sparingly soluble sodium salt of the 5-sulphonic acid is also filtered by suction and the 2.3-dichloro-4-amino-1-methylbenzene-6-sulphonic acid is precipitated from the filtrate by means of a mineral acid.

(3) 220.5 parts of 2-bromo-3-chloro-4-amino-1-methylbenzene, obtainable according to the process above described for the preparation of 2.3-dichloro-4-amino-1-methylbenzene but starting from 2-bromo-4-amino-1-methylbenzene, are dissolved in 500 parts of sulfuric acid monohydrate, 500 parts of fuming sulfuric acid containing 65 per cent of sulfuric anhydride are then added, the mixture is rapidly heated up to 120° C. and immediately poured on ice. The separation of the sulphonic acid is completed by adding sodium chloride. The sulphonic acid is filtered by suction, the paste is stirred with 1 liter of water and rendered feebly alkaline by the addition of sodium hydroxide; thereupon the mass is filtered from the minute quantity of the sparingly soluble sodium salt of 2-bromo-3-chloro-4-amino-1-methylbenzene-5-sulphonic acid; the 2-bromo-3-chloro-4-amino-1-methylbenzene-6-sulphonic acid is precipitated in the filtrate by means of hydrochloric acid. The sulphonic acid thus obtained is a white powder, yields a very readily soluble sodium salt and can very easily be diazotized.

We claim:

1. The process which comprises heating a compound of the following general formula:

wherein X stands for a chlorine or a bromine atom, dissolved in a sulfuric acid monohydrate with a large excess of fuming sulfuric acid containing about 65 per cent of sulfuric anhydride rapidly to a temperature up to 120° C.

2. The process which comprises heating a compound of the following general formula:

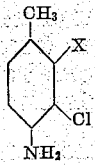

wherein X stands for a chlorine or a bromine atom, dissolved in sulfuric acid monohydrate rapidly to a temperature of about 90° C. to 120° C. with about 3 times its weight of fuming sulfuric acid containing about 65 per cent of sulfuric anhydride and then immediately pouring the mixture into water cooled by ice.

3. The process which comprises heating 1 part of 2.3-dichloro-4-amino-1-methylbenzene dissolved in about 3 times its weight of sulfuric acid monohydrate rapidly to a temperature of about 90° C. to 120° C. with about 3 times its weight of sulfuric acid monohydrate containing about 65 per cent of sulfuric anhydride and then immediately pouring the mixture on ice.

4. As new products, the compounds of the following general formula:

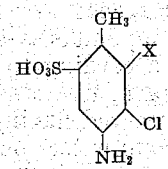

wherein X stands for a chlorine or a bromine atom, being white powders, forming very readily soluble sodium salts and being very easily diazotizable.

5. As a new product, the 2.3-dichloro-4-amino-1-methylbenzene-6-sulphonic acid of the following formula:

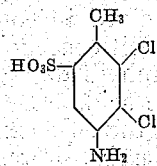

being a white powder, forming a very readily soluble sodium salt and being very easily diazotizable.

In testimony whereof, we affix our signatures.

HERMANN WAGNER.
ALBERT KISSLING.
ERNST HOTZ.
WILHELM FITZKY.